United States Patent
Chen et al.

(10) Patent No.: US 7,672,242 B2
(45) Date of Patent: Mar. 2, 2010

(54) TRAFFIC MANAGEMENT DEVICE AND METHOD THEREOF

(75) Inventors: Jin-Ru Chen, Hsinchu (TW);
Chuen-Kuei Chang, Tongsiao Township, Miaoli County (TW)

(73) Assignee: Realtek Semiconductor Corp., Hsinchu (TW)

( * ) Notice: Subject to any disclaimer, the term of this patent is extended or adjusted under 35 U.S.C. 154(b) by 258 days.

(21) Appl. No.: 11/984,857

(22) Filed: Nov. 23, 2007

(65) Prior Publication Data
US 2008/0267205 A1    Oct. 30, 2008

(30) Foreign Application Priority Data
Nov. 23, 2006    (TW) ............... 95143404 A

(51) Int. Cl.
*G01R 31/04* (2006.01)

(52) U.S. Cl. .............. 370/235.1; 370/230.1; 370/395.4; 370/412; 710/29

(58) Field of Classification Search ........................ None
See application file for complete search history.

(56) References Cited

U.S. PATENT DOCUMENTS

| | | | |
|---|---|---|---|
| 5,361,063 A | 11/1994 | Jaffe et al. | |
| 6,167,029 A | 12/2000 | Ramakrishnan | |
| 6,405,258 B1 | 6/2002 | Erimli et al. | |
| 7,260,062 B2 | 8/2007 | Bowen, Jr. et al. | |
| 2001/0012272 A1* | 8/2001 | Aubert et al. | 370/230 |
| 2003/0123390 A1* | 7/2003 | Takase et al. | 370/230.1 |
| 2003/0147347 A1 | 8/2003 | Chen et al. | |
| 2003/0221026 A1* | 11/2003 | Newman | 710/8 |
| 2005/0174944 A1* | 8/2005 | Legault et al. | 370/235.1 |

FOREIGN PATENT DOCUMENTS

| TW | 1244285 | 11/2005 |
|---|---|---|
| TW | 1245506 | 12/2005 |

OTHER PUBLICATIONS

Communication from the Taiwan Patent Office dated Sep. 30, 2009 with regard to the counterpart Taiwan Application 095143404.
Sidi, M, et al.; "Congestion Control Through Input Rate Regulation"; IEEE Transactions on Communications, vol. 41, No. 3, Mar. 1993, pp. 471-477.

* cited by examiner

*Primary Examiner*—Bob A Phunkulh
(74) *Attorney, Agent, or Firm*—Rosenberg, Klein & Lee

(57) ABSTRACT

A traffic management device and the method thereof are disclosed. The traffic management device includes a control logic unit, a first counting unit, and a second counting unit. The traffic management method follows the dual leaky bucket mechanism. A first count value and a second count value are generated by the first counting unit and the second counting unit, respectively, such that the control logic unit controls the average rate by checking whether the first count value falls within the range of a first threshold and controls the peak rate by checking whether the second count value falls within the range of a second threshold. When both the conditions are satisfied, packets in the queue are transmitted. Thus, the network flow is controlled effectively.

19 Claims, 3 Drawing Sheets

TRAFFIC MANAGEMENT DEVICE AND METHOD THEREOF

BACKGROUND OF THE INVENTION

The present invention relates to a traffic management device and the method thereof.

Due to the fast development of computer application and network communication technologies, the number of network users has dramatically increased. Thus, the increase in the traffic in the router is fast and significant. Although the bandwidth connectivity to the servers is improving, traffic congestion is still inevitable. This is caused by the poor quality of network service.

As to the network applications that require quality of service (QoS) such as Video Conferencing, Distance Learning, and Video on Demand, all specify a guaranteed throughput level for maintaining the connection quality. During the transmission process, the transmission speed is affected by the network quality. When various packets are simultaneously transmitted, it is difficult to guarantee a minimum bandwidth and a stable connection for every flow.

A common solution is to increase the bandwidth with the help of technologies such as asymmetrical digital subscriber lines (ADSL) provided by Internet Service Provider (ISP) or broadband access service provided by cable modems. However, at the user end, these two kinds of services use an Ethernet connection that provides the maximum bandwidth. If no limit on the maximum bandwidth at the user end exists, the network devices enter an overloaded state. Moreover, for network administrators, the bandwidth needs to be limited in order to cope with the exponential growth and dramatic increase of the network traffic, such that network congestion is avoided.

Thus, there is a need to provide a new traffic management device and a method thereof that not only improves the conventional network congestion but also effectively employs the bandwidth of each flow for overcoming the abovementioned shortcomings.

SUMMARY OF THE INVENTION

Therefore, it is the primary objective of the present invention to provide a traffic management device and a method thereof that controls the average rate of network flow.

Another objective of the present invention is to provide a traffic management device and a method thereof that controls the peak rate of the network flow.

A further objective of the present invention is to provide a traffic management device and a method thereof that adjusts the average rate and the peak rate according to the users' needs, in order to achieve an effective control of the network flow.

The traffic management device in accordance with the present invention comprises a control logic unit, a first counting unit, and a second counting unit. The traffic management method of the present invention controls the flow of the packets in a queue. A first counting unit and a second counting unit generate a first count value and a second count value, respectively. When the first count value falls within the range of a first threshold and the second count value also falls within the range of a second threshold, the packets in the queue are transmitted by the control of the control logic unit. Thus, the network bandwidth is effectively adjusted.

BRIEF DESCRIPTION OF THE DRAWINGS

The structure and the technical means adopted by the present invention to achieve the abovementioned and other objectives can be best understood by referring to the following detailed description of the preferred embodiments and the accompanying drawings wherein.

DETAILED DESCRIPTION OF THE PREFERRED EMBODIMENT

Figure 1:
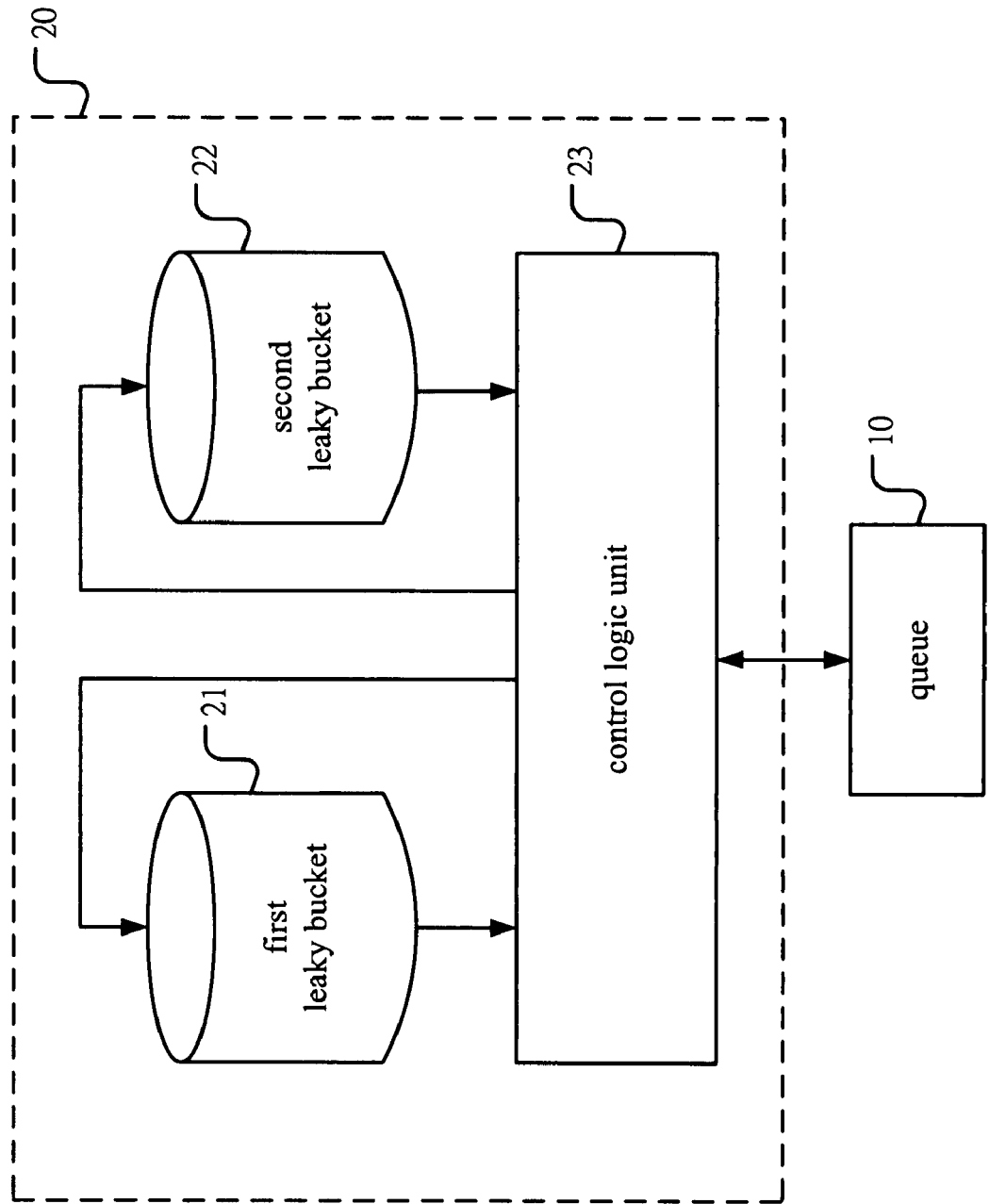
FIG. 1 is a schematic drawing of an embodiment in accordance with the present invention.

As shown in FIG. 1, a traffic management device 20 is used for the flow control of network devices such as switches. The traffic management device 20 is connected with a queue 10, which holds the packets awaiting transmission, for the control of packet transmission. Using the dual leaky bucket algorithm, traffic management device 20 controls the average rate and peak rate of packet transmission.

Traffic management device 20, in accordance with the present invention, comprises a first leaky bucket 21, a second leaky bucket 22, and a control logic unit 23. By using the control logic unit 23 in combination with first leaky bucket 21, the traffic management device 20 controls the average rate at which the queue 10 transmits the packets.

The first leaky bucket 21 mainly controls the queue 10 in order to drive the queue 10 to transmit the packets at a certain average rate, while the second leaky bucket 22 manages the interval between the packets transmitted by the queue 10 for control of the peak rate.

The first leaky bucket 21 includes first tokens and a first threshold, while the second leaky bucket 22 includes second tokens and a second threshold. Moreover, the first leaky bucket 21 includes a burst size that represents the range between the first threshold and a third threshold. Thus, the first threshold equals the burst size plus the third threshold.

The number of the first tokens is continuously decreased according to a first decreasing frequency and a first decreasing number by the first leaky bucket 21, while the second leaky bucket 22 decreases the number of the second tokens according to a second decreasing frequency and a second decreasing number. Furthermore, when the number of the first tokens is decreased within the range of the third threshold, first leaky bucket 21 stops decreasing the number of first tokens. Similarly, when the number of second tokens is decreased within the range of the second threshold, which means the number of second tokens is no longer more than the second threshold, the second leaky bucket 22 stops decreasing the number of second tokens.

When the control logic unit 23 detects a packet entering the queue 10, it compares the number of the first tokens of the first leaky bucket 21 with the first threshold. When the number of the first tokens falls within the range of the first threshold (i.e., not more than the first threshold), then the number of the second tokens of the second leaky bucket 22 is compared with the second threshold. Once the number of second tokens fall within the range of the second threshold (i.e., not more than the second threshold), a driving signal is transmitted to the queue 10 for driving the queue 10 to transmit the packets, and a shortage of the first tokens of the first leaky bucket 21 as well as a shortage of the second tokens of the second leaky bucket 22 is compensated. The number of the first tokens and the second tokens being compensated is determined according to the packet size transmitted by the queue 10. In an embodiment of the present invention, this number is equal to the packet size transmitted by the queue 10. According to the circumstances, the number of the first tokens being compensated is not necessarily equal to the number of the second token being compensated. By the method mentioned above, the average rate and the peak rate of packet transmission of the queue 10 are controlled. The number of first tokens of first leaky bucket 21 as well as the number of second tokens of second leaky bucket 22 with the thresholds, no matter the orders of comparison, falls within the scope of the present invention.

Figure 2:
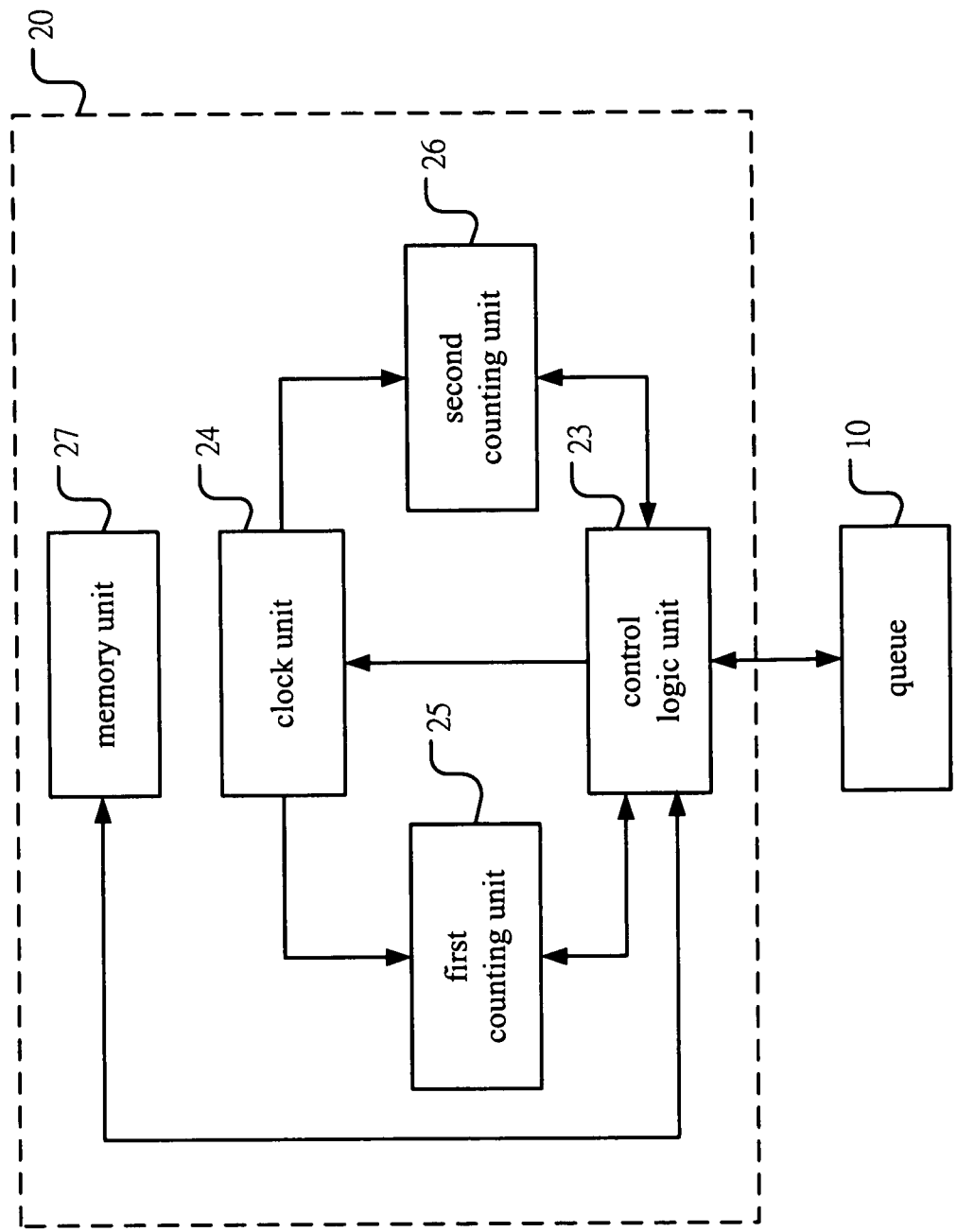
FIG. 2 is a block diagram of the embodiment in accordance with the present invention.

Referring to FIG. 2, another embodiment of the present invention is disclosed. As shown in the figure, queue 10 receives the packets, and the traffic management device 20 is coupled with the queue 10 for the flow control of the packets of the queue 10. The traffic management device 20 is composed of a clock unit 24 that generates a first clock signal according to a first decreasing frequency and generates a second clock signal according to a second decreasing frequency. The clock unit 24 can be an oscillator. A first counting unit 25 generates a first count value and decreases the first count value according to the first clock signal and a first decreasing number. A second counting unit 26 is used for generating a second count value and also decreasing the second count value according to the second clock signal and a second decreasing number. In accordance with the above description, the first count value and the second count value respectively represent the number of the first tokens and the number of the second tokens, as shown in FIG. 1.

The control logic unit 23 is coupled with the clock unit 24, the first counting unit 25, and the second counting unit 26. While detecting a packet entering the queue 10, the control logic unit 23 detects the first count value of the first counting unit 25 as well as the second count value of the second counting unit 26 and compares the first count value as well as the second count value with the first threshold and the second threshold, respectively, in order to check whether the first count value falls within the range of the first threshold and whether the second count value falls within the range of the second threshold. When the first count value falls within the range of the first threshold and the second count value also falls within the range of the second threshold, a driving signal is transmitted to the queue 10 in order to drive the queue 10 transmit the packet, and a replenish signal is transmitted to the first counting unit 25 and the second counting unit 26. According to the replenish signal, the first counting unit 25 and the second counting unit 26 respectively add a replenish value to the first count value of the first counting unit 25 and the second count value of the second counting unit 26. When the control logic 23 detects that the first count value of the first counting unit 25 is no longer more than the third threshold, it transmits a stop signal to the first counting unit 25 such that the first counting unit 25 stops counting the first count value. When the control logic unit 23 detects that the second count value of the second counting unit 26 is no longer more than the second threshold, it transmits a stop signal to the second counting unit 26 such that the second counting unit 26 stops counting the second count value. In this embodiment, the first leaky bucket 21 includes the clock unit 24 and the corresponding first counting unit 25, while the second leaky bucket 22 includes the clock unit 24 and the corresponding second counting unit 26.

In addition, traffic management device 20 includes memory unit 27 coupled with the control logic unit 23 for storing the values of the first threshold, the second threshold, the third threshold, the first decreasing frequency, the first decreasing number, the second decreasing frequency, and the second decreasing number and for being read by the control logic unit 23. The control logic unit 23 is used to set up the parameters of the clock unit 24, the first counting unit 25, and the second counting unit 26.

Figure 3:
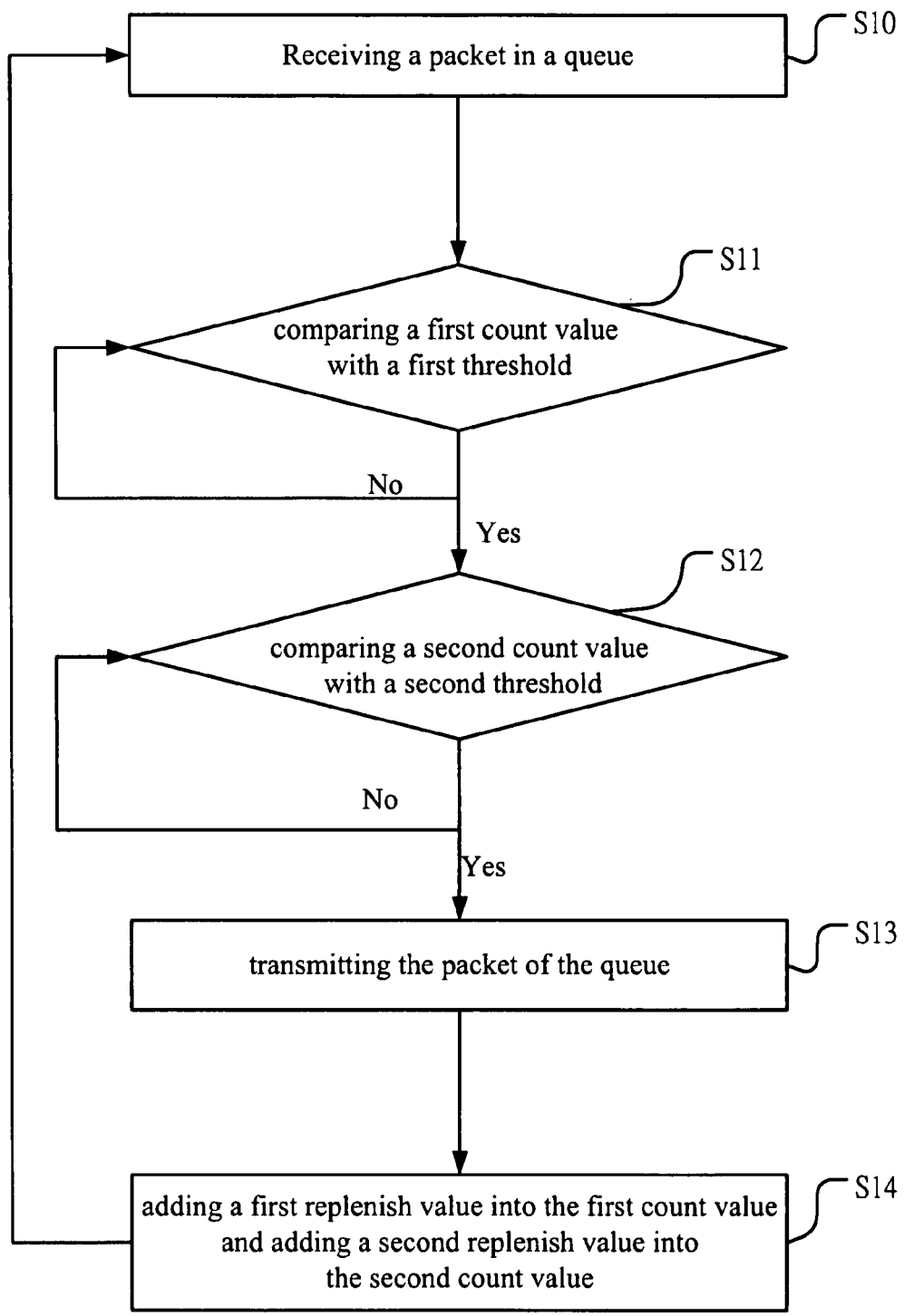
FIG. 3 is a flow chart of the embodiment in accordance with the present invention.

Referring to FIG. 3, a flow chart of the embodiment is illustrated according to the present invention. In the beginning, when step S10 is executed, a packet is received and is placed in a queue. Then, in step S11, a first count value is compared with a first threshold. If the first count value falls within the range of the first threshold, run step S12, i.e., compare a second count value with a second threshold. Once the second count value also falls within the range of the second threshold, execute step S13, i.e., transmit the packet in the queue. Next, run step S14, add a first replenish value to the first count value and add a second replenish value to the second count value.

In step S11, the first count value is continuously decreased according to a first decreasing frequency and a first decreasing number. When the first count value is no longer more than the third threshold, the first count value stops decreasing. Similarly, in step S12, the second count value is continuously decreased according to a second decreasing frequency and a second decreasing number. While the second count value is no longer more than the second threshold, the second count value stops decreasing. According to various circumstances, the two sets of parameters—the first decreasing frequency and the first decreasing number, and the second decreasing frequency and the second decreasing number—can be adjusted. Moreover, the order of step S11 and step S12 can be exchanged, and this does not affect the result.

In another embodiment, it is assumed that the second threshold is 30, the third threshold is 40, the burst size is 1,522, the first decreasing frequency is 4 times per time interval, the second decreasing frequency is 2 times per time interval, and the second decreasing number is 5. Because the first threshold equals the burst size plus the third threshold, the first threshold is 1,562. When a 64-bit packet enters the queue, detected by the control logic unit, the first count value is compared with the first threshold, and then, the second count value is compared with the second threshold. In the initial status, the first count value and the second count value are respectively set as the third threshold and the second threshold. Now, the first count value and the second count value respectively fall within the scope of the first threshold and the second threshold. The first count value is 40, not more than the first threshold that is 1,562, while the second count value is 30, not more than the second threshold that is 30. The packet in the queue is controlled by the control logic unit and the packet size 64 is added to the first count value as well as the second count value. Now, the first count value becomes 104 (40+64) and the second count value becomes 94 (30+64). When the next packet, whose size is still 64, enters the queue, the first count value 104 is still within the range of the first threshold, but the second count value 94 is larger than 30, not within the range of the second threshold. Thus, it needs to be decreased according to the second decreasing frequency and the second decreasing number. After approximately 6.5 time intervals, the second count value is less than 30, and then, the control logic unit allows the queue to transmit the packet. Thus, a burst caused by the successive transmission of a plurality of 64-bit packets as mentioned above can be avoided. Although the burst size can be reset to a smaller value (smaller than 1,522), the packet with a size of 1600 cannot be transmitted when such a packet enters the queue. Therefore, the average rate of the network flow is controlled by the adjustment of the first decreasing frequency and the first decreasing number, while the peak rate of the network flow is controlled by the intervals between each packet through the adjustment of the second decreasing frequency, the second decreasing number, and the second threshold.

In summary, it is learned from the principle of flow control in accordance with the present invention mentioned above that the first leaky bucket and the second leaky bucket will finish their job by the first count value and the second count value that is being decreased by the first counting unit and the second counting unit. Thus, the average rate and the peak rate of the network flow are further controlled.

Additional advantages and modifications will readily occur to those skilled in the art. Therefore, the invention in its broader aspects is not limited to the specific details, and the representative devices shown and described herein. Accordingly, various modifications may be made without departing from the spirit or scope of the general inventive concept as defined by the appended claims and their equivalents.

What is claimed is:

1. A network traffic management method comprising the steps:
   receiving a packet by a queue;
   comparing a first count value with a first threshold to check whether the first count value falls within the range of the first threshold; and
   comparing a second count value with a second threshold to check whether the second count value falls within the range of the second threshold;
   wherein the packet in the queue is transmitted when the first count value falls within the range of the first threshold and the second count value falls within the range of the second threshold; and a first replenish value is added to the first count value, while a second replenish value is added to the second count value.

2. The method as claimed in claim 1, wherein the method further comprises the steps:
   decreasing the first count value continuously according to a first decreasing frequency and a first decreasing number; and
   decreasing the second count value continuously according to a second decreasing frequency and a second decreasing number.

3. The method as claimed in claim 2, wherein in the step of decreasing the first count value, the first count value stops decreasing when the first count value falls within the range of a third threshold.

4. The method as claimed in claim 3, wherein the first threshold equals a burst size plus the third threshold.

5. The method as claimed in claim 2, wherein in the step of decreasing the second count value, the second count value stops decreasing when the second count value falls within the range of the second threshold.

6. The method as claimed in claim 1, wherein in the step of adding a first replenish value to the first count value and adding a second replenish value to the second count value, the first replenish value is determined according to the size of the packet passing through the queue.

7. The method as claimed in claim 1, wherein in the step of adding a first replenish value to the first count value and adding a second replenish value to the second count value, the second replenish value is determined according to the size of the packet passing through the queue.

8. A network traffic management device comprising:
   a queue receiving a packet;
   a first counting unit generating a first count value;
   a second counting unit generating a second count value; and
   a control logic unit coupled with the queue, the first counting unit, and the second counting unit, transmitting a driving signal to the queue when the first count value falls within the range of a first threshold and the second count value falls within the range of a second threshold in order to drive the queue to transmit the packet; the replenish signal is transmitted to the first counting unit and the second counting unit by the control logic unit for driving the first counting unit to add the first replenish value to the first count value as well as driving the second counting unit to add the second replenish value to the second count value.

9. The device as claimed in claim 8, wherein the first counting unit continuously decreases the first count value according to a first decreasing frequency and a first decreasing number, while the second counting unit continuously decreases the second count value according to a second decreasing frequency and a second decreasing number.

10. The device as claimed in claim 8, wherein the device further comprising:
    a clock unit coupled with the first counting unit and the second counting unit that respectively generates a first clock signal and a second clock signal;
    wherein the first counting unit continuously decreases the first count value according to the first clock signal and a first decreasing number, while the second counting unit continuously decreases the second count value according to the second clock signal and a second decreasing number.

11. The device as claimed in claim 10, wherein the clock unit generates a first clock signal according to a first decreasing frequency.

12. The device as claimed in claim 10, wherein the clock unit generates a second clock signal according to a second decreasing frequency.

13. The device as claimed in claim 10, wherein the clock unit is an oscillator.

14. The device as claimed in claim 10, wherein the first counting unit stops decreasing the first count value when the first count value falls within the range of a third threshold.

15. The device as claimed in claim 14, wherein the first threshold equals a burst size plus the third threshold.

16. The device as claimed in claim 10, wherein the second counting unit stops decreasing the second count value when the second count value falls within the range of the second threshold.

17. The device as claimed in claim 8, wherein the device further comprising:
    a memory unit coupled with the control logic unit for storing the values of the first threshold and the second threshold for being read by the control logic unit.

18. The device as claimed in claim 8, wherein the first replenish value is determined according to the size of the packet passing through the queue.

19. The device as claimed in claim 8, wherein the second replenish value is determined according to the size of the packet passing through the queue.

* * * * *